United States Patent [19]

Suzuki et al.

[11] 4,307,950
[45] Dec. 29, 1981

[54] FOCUS ADJUSTING DEVICE FOR CAMERA

[75] Inventors: Toyotosi Suzuki; Hideo Tamamura, both of Tokyo; Shuichi Tamura; Mutsuhide Matsuda, both of Yokohama, all of Japan

[73] Assignee: Canon Kabushiki Kaisha, Tokyo, Japan

[21] Appl. No.: 193,538

[22] Filed: Oct. 3, 1980

[30] Foreign Application Priority Data

Oct. 8, 1979 [JP] Japan .................................. 54-129649

[51] Int. Cl.³ ........................ G03B 13/02; G02B 7/02
[52] U.S. Cl. ..................................... 354/195; 350/255
[58] Field of Search .......................... 350/255, 257, ; 354/195, 196

[56]  References Cited

U.S. PATENT DOCUMENTS

| 1,848,402 | 3/1932 | Wollensak | 350/255 |
| 3,897,998 | 8/1975 | Someya et al. | 350/255 X |
| 3,914,026 | 10/1975 | Kanno | 350/255 |

*Primary Examiner*—Donald A. Griffin
*Attorney, Agent, or Firm*—Toren, McGeady & Stanger

[57]  ABSTRACT

The present invention is to provide a focus adjusting device for a camera, particularly a focus adjusting device capable of fine adjustment of the position of the focal plane with ease.

One of the characteristic features of the present invention is that the lens barrel is provided with an adjusting member such as a screw in screw-threaded relation thereto, so that all that is necessary to effect a fine adjustment of the initial position of the lens barrel relative to the camera body is to rotate the screw to adjust the length of that portion of the screw which projects outwardly of the lens barrel.

4 Claims, 6 Drawing Figures

FOCUS ADJUSTING DEVICE FOR CAMERA

BACKGROUND OF THE INVENTION

1. Field of the Invention

This invention relates to focus adjusting devices and more particularly to a device for axially moving a lens barrel.

2. Description of the Prior Art

It is known to provide a lens barrel moving device in the form of a helicoid thread on the lens barrel. The arrangement of the helicoid thread groove in the lens barrel is, however, very difficult from the point of view of machining and the formation of the helicoid thread directly in the lens barrel gives rise to a problem in that when the lens barrel is axially moved, it is caused to rotate about the optical axis thereof simultaneously. For this reason, the conventional device for axially moving the lens barrel by the use of the helicoid thread necessitates a supplementary mechanism for constraining the lens barrel from rotative movement. This calls for a large increase in the complexity of the structure of the control device for the lens barrel and the bulk and size thereof.

SUMMARY OF THE INVENTION

With the foregoing in mind, an object of the present invention is to eliminate the above-described drawbacks of the conventional device and to provide a focus adjusting device using a cam ring in controlling the axial movement of the lens barrel and capable of performing a fine adjustment of the focus very easily.

Another object of the present invention is to provide a focus adjusting device capable of performing a fine adjusting operation of the focus adjustment by adjusting the amount of projection of a screw-threaded in the lens barrel.

These and other objects of the invention will become apparent from the following detailed description of an embodiment taken in conjunction with the accompanying drawings.

DESCRIPTION OF THE PREFERRED EMBODIMENT

Figure 1:
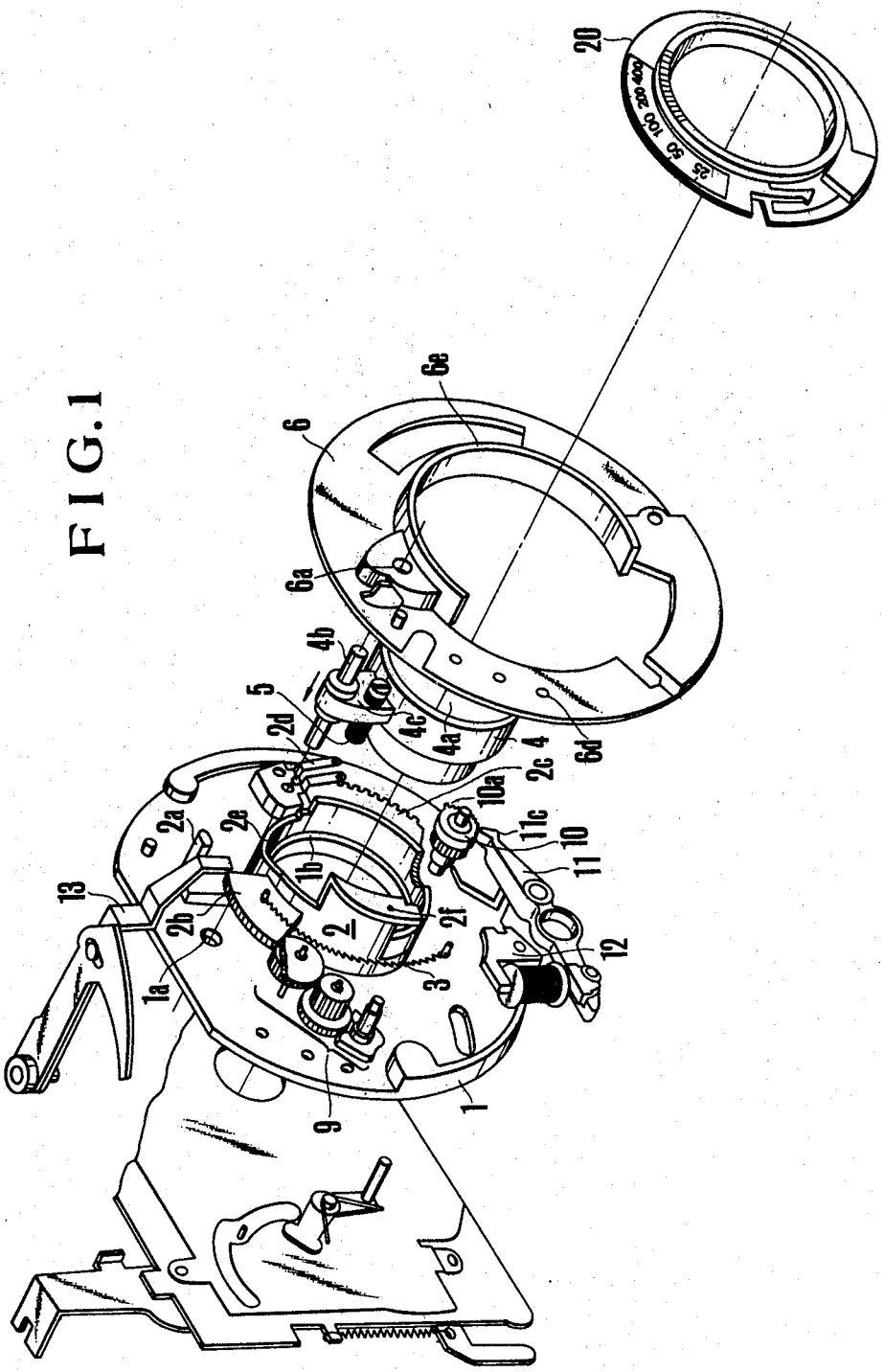
FIG. 1 is an exploded perspective view of one embodiment of a focus adjusting device according to the present invention.
Figure 2:
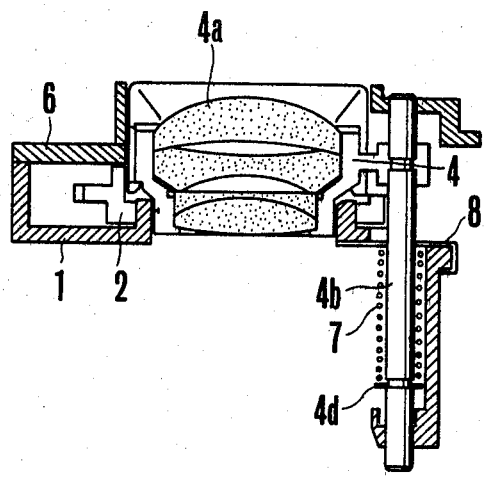
FIG. 2 is a sectional view of the lens barrel of FIG. 1.
Figure 3:
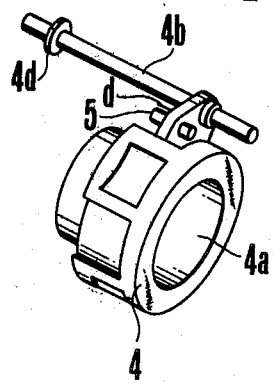
FIG. 3 is a perspective view of the lens barrel of FIG. 1.
Figure 4:
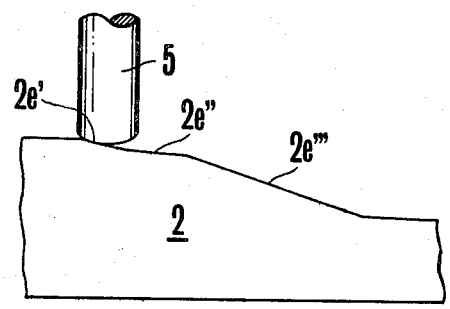
FIG. 4 is an elevational view showing an abutting engagement of the screw 5 on the camming surface of the adjusting member 2 of FIG. 1.
Figure 5:
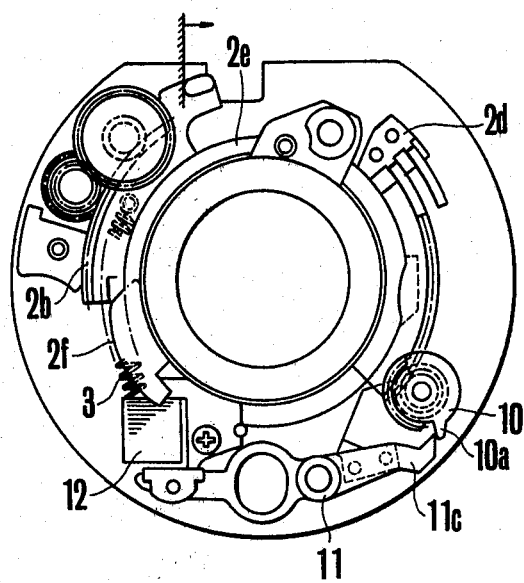
FIG. 5 is an elevational view of the device of FIG. 1.
Figure 6:
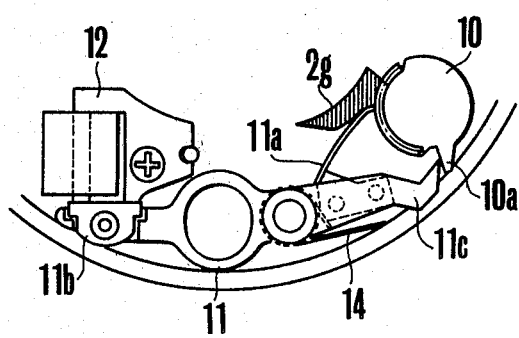
FIG. 6 is a fragmentary elevational view showing the details of the stop lever 11 of FIG. 11.

A focus adjusting device of the present invention will next be described in greater detail. FIG. 1. is an exploded perspective view showing the construction and arrangement of the main parts of the focus adjusting device of the present invention as applied to a photographic camera. In the figure, 1 is a casing of a mechanical mounting for a lens barrel; 2 is a distance adjusting member having an extension 2a for charging in engagement with a lever 13 when in a set position as shown in FIG. 1, a gear 2b engaging with a governor to be described more fully later, a gear 2c engaging with a stop wheel, contacts 2d functioning as an actuator switch for a distance dependent signal processing circuit (not shown), a cam 2e for control of axial movement of the lens, a flash-auto cam 2f and a stop pawl lever charging cam 2g of FIG. 6. The distance adjusting member 2 is rotatably fitted on a guide portion 1b of the casing 1. A spring 3 is tensioned between a pin planted on the above-described gear 2b and a pin on the casing 1, urging the adjusting member 2 to turn in a counter-clockwise direction. The governor 9 comprises a gear engaging with the gear 2b, an escape wheel and anchor and functions to maintain the speed of rotation of the adjusting member 2 at an almost constant level. The stop wheel 10 formed in unison with that of the gears which engages with the gear 2c rotates as the member 2 rotates. This stop wheel 10 has a protuberance formed in a portion of the outer periphery thereof and arranged to be engageable with a pawl 11c of the stop lever to be described later, so that rotation of the member 2 is stopped against the force of spring 3. 4 is a lens barrel holding a photographic objective lens 4a as shown in FIGS. 2 and 3. This lens barrel 4 has a carrier 4c to which is fixedly connected a guide shaft 4b in parallel relation to the optical axis thereof as shown in FIGS. 2 and 3. This guide shaft 4b is arranged to be axially movable past a guide hole 1a in the casing 1 and a guide hole 6a in a front base plate 6 fastened to the casing 1 by screw fasteners. This shaft 4b is urged to move in a direction indicated by the arrow (FIG. 1) by a spring 7 between a washer 4d fixed thereto and an abutment plate 8. 5 is a focus adjusting screw threaded in the carrier 4c of the lens barrel 4, and the amount of projection of the screw 5 from the carrier 4c defined by d (FIG. 3) can be varied by rotating the screw 5. Since the spring 7 urges the shaft 4b to move in the direction indicated by the arrow as has been mentioned above, the front end of the screw 5 is in abutting engagement on the cam 2e of the member 2 as shown in FIG. 4. The camming surface of the distance adjusting member 2 is configured to have three distinct sections, of which the first 2e' is made so steep that the load on the adjusting member 2 is lessened at the start of rotation from the initial position, and the second 2e" is made so gentle as to provide a preparatory stroke which does not contribute substantially to a distance adjusting operation. It is noted that just when the screw 5 transits from the first to the second section, the contacts 2d are switched on to start power supply to the distance dependent signal processing circuit. This is because the processing circuit generally takes an adequate time before it is stabilized. The provision of the camming surface portion 2e" as creating the preparatory stroke operates to increase the accuracy and reliability of focus adjustment, as the distance detecting operation has been stabilized when the camming movement of the screw 5 transits from the second to the third surface portion 2e'''. It is further noted that another advantage of the provision of the gentle camming surface 2e" is to make it possible to shorten the width of the adjusting member 2 and therefore, to facilitate the compactness of the camera. With such cam mechanism, as the adjusting member 2 rotates, the screw 5 is driven to move by the camming surface 2e, whereby the lens barrel 4 is axially moved forwardly with the resultant position of the lens barrel depending upon the amount of rotation of the adjusting member 2, that is, the camera-to-object distance. 11 is a stop pawl lever with an armature 11b fixedly mounted at the tail end thereof as shown in FIG. 6; the head of which is configured as a pawl 11c. This lever 11 is provided with a leaf spring 11a and a hair spring 14 urging the lever 11 to turn in a counterclockwise direction. 12 is an electromagnet arranged upon energization to attract the armature 11b, whereby stop pawl 11c is maintained out of engagement with any one of the teeth of the stop wheel 10. Since the stop wheel is provided with the protuberance 10a, as the object is located at infinity, when the processing circuit does not produce a detection signal in a time interval necessary for the protuberance 10a to come in contact with the stop pawl 11c, the adjusting member is stopped by the stop lever 11 in engagement at its pawl 11c with the protuberance 10a. The base plate 6 in addition to the above-described guide hole 6a has holes 6d for the shafts of the governor 9, and a tubular portion 6e on which a film speed presetting ring 20 is rotatably fitted.

Next explanation is given to the focus adjusting operation of the focus adjusting device illustrated above. As has been mentioned above, the protuberance 10a of the stop wheel 10 is arranged so that when the distance dependent signal processing circuit produces no actuating signal, that is, when the object distance sensed is infinite or in a pan-focus range, the adjusting member 2 gets stopped from further rotation by the pawl 11c of the stop lever 11. In this stopped position, therefore, the lens barrel 4 assumes the forward terminal end of axial movement which represents the infinitely distant position or pan-focus position (near 15 meters). With the stop pawl 11c and the protuberance 10a left engaged with each other, when the adjusting screw 5 is rotated so as to adjust the amount of projection, d, thereof, the sharp image plane of the photographic lens 4a for the infinitely distant object can be made to lie in coincidence with the film plane. Thus, it is made possible to manufacture focus adjusting devices with the advantage that the fine focus adjustment can be made with very much ease.

The operation of the mechanical mounting for the lens is as follows: The mounting mechanism is assumed to be previously set in the shutter cocked position of FIG. 1. Then, when a release button (not shown) is depressed, the latching lever 13 is taken out of engagement with the extension 2a, permitting the member 2 to turn in the counterclockwise direction under the action of the spring 3, while the camming surface 2e is pushing the screw 5. Since, as mentioned above, the screw 5 is threadedly fixed to the lens barrel 4, and since the guide shaft 4b is arranged to be slidingly movable in the axial direction, the lens barrel 4 is driven by the camming surface 2e to move forwards. On the other hand, the start of movement of the member 2 causes the contacts 2d to start current supply to the signal processing circuit (not shown). Then, as the member 2 turns in the effective focusing range, when a condition of sharp focus is detected, an actuating signal is produced and applied to the electromagnet 12, whereby the electromagnet 12 is deenergized. In more detail, the object distance is photoelectrically sensed, while simultaneously measuring the amount of rotation of the member 2. When the outputs of the light sensor and the position sensor coincide with each other, the duration of energization of the magnetic winding 12 is terminated. Then, the lever 11 is turned in the counterclockwise direction by the action of spring 14, whereby the stop pawl 11c is brought into engagement with one of the teeth of the stop wheel 10 to stop the stop wheel from further rotation. Since, as has been mentioned above, the gear on the stop wheel 10 meshes with the gear 2c on the member 2, when the stop wheel 10 is arrested, the member 2 no longer moves forwards, thus the focusing operation of the lens barrel 4 is completed.

As has been described in greater detail, in the focus adjusting device of the present invention, when assembling the parts thereof, only adjustment of the amount of projection of a single member screw-threaded in the lens holder suffices to achieve the fine adjustment of the position of the sharp image plane. This screw-threaded member also serves as a cam follower for controlling the axial movement of the lens. Therefore, the control mechanism for the lens holder can be constructed in a very simple form with a great advantage to the focus adjusting device for cameras.

What is claimed is:
1. A focus adjusting device for a camera comprising:
   (a) a lens barrel arranged to be movable along an optical axis of the lens;
   (b) an adjusting member screw-threaded in said lens barrel, the amount of projection of said adjusting member relative to said lens barrel being adjusted by adjusting the screw-threaded amount; and
   (c) a cam member rotatably fitted in relation to a camera body, said cam member having a camming surface cooperative with said adjusting member, whereby when said cam member rotates, the said lens barrel is axially moved.
2. A focus adjusting device for a camera comprising:
   (a) a lens barrel arranged to be slidable relative to a camera body and to move along an optical axis of the lens;
   (b) an adjusting member screw-threaded in said lens barrel, the amount of projection of said member in an axial direction being adjusted by adjusting the screw-threaded amount;
   (c) a cam member rotatably fitted in relation to a camera body, said cam member having a camming surface on which said adjusting member abuts, whereby rotation of said cam member causes axial movement of said lens barrel; and
   (d) drive means for driving said cam member to rotate, said means being actuated in response to a release actuation, causing the cam member to rotate.
3. A focus adjusting device for a camera comprising:
   (a) a lens barrel arranged to be movable in axial direction;
   (b) a cam member rotatably fitted in relation to a camera body, said cam member having a camming surface operatively coupled to said lens barrel so that when the cam member rotates, the lens barrel is axially moved, and said camming surface being configured to a steep slope in a start region so that the load at the start of rotation of said cam member is lessened; and
   (c) drive means for driving said cam member to rotate, said means driving said cam member to rotate from the start position in response to an actuation.
4. A focus adjusting device for a camera comprising:
   (a) a lens barrel arranged to be slidable relative to a camera body and to move along an optical axis of the lens;
   (b) a cam member rotatably fitted in relation to a camera body, said cam member having a camming surface, said camming surface being operatively coupled to said lens barrel so that as the cam member rotates, the lens barrel is axially moved forwards with the resultant amount of axial movement of the lens barrel depending upon the shape of the camming surface, said camming surface being provided with a first section cooperative with said lens barrel at the start, a second section contiguous to said first section, and a third section contiguous to said second section, said first camming surface section being made steeper in slope to form a start stroke of reducing the load on the cam member at the start of rotation thereof, said second camming surface section being made gentle in slope to form a preparatory stroke to the forward axial movement of said lens barrel, and said third camming surface section forming a stroke of adjusting the amount of axial movement of the lens barrel.

* * * * *